US007536550B2

(12) United States Patent
Maki

(10) Patent No.: US 7,536,550 B2
(45) Date of Patent: May 19, 2009

(54) IMAGE FORMING APPARATUS AND CONTROL METHOD FOR SAME

(75) Inventor: Nobuhiko Maki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 944 days.

(21) Appl. No.: 10/445,231

(22) Filed: May 27, 2003

(65) Prior Publication Data
US 2003/0226039 A1 Dec. 4, 2003

(30) Foreign Application Priority Data
May 29, 2002 (JP) ............................ 2002-156002
Apr. 15, 2003 (JP) ............................ 2003-110650

(51) Int. Cl.
*H04L 9/32* (2006.01)
*H04L 9/00* (2006.01)
(52) U.S. Cl. ....................... 713/168; 713/166; 713/182; 726/4; 726/17; 726/3; 726/16
(58) Field of Classification Search ..................... 726/3, 726/4, 16, 17; 713/166, 168, 182
See application file for complete search history.

(56) References Cited

U.S. PATENT DOCUMENTS

| 4,734,568 | A | * | 3/1988 | Watanabe | 235/487 |
|---|---|---|---|---|---|
| 5,613,012 | A | * | 3/1997 | Hoffman et al. | 382/115 |
| 5,774,552 | A | * | 6/1998 | Grimmer | 713/156 |
| 6,163,383 | A | * | 12/2000 | Ota et al. | 358/1.1 |
| 6,233,684 | B1 | * | 5/2001 | Stefik et al. | 713/176 |
| 6,892,307 | B1 | * | 5/2005 | Wood et al. | 726/8 |
| 6,996,581 | B2 | * | 2/2006 | Houston et al. | 707/200 |
| 7,058,806 | B2 | * | 6/2006 | Smeets et al. | 713/166 |
| 7,076,797 | B2 | * | 7/2006 | Loveland | 726/4 |
| 7,403,765 | B2 | * | 7/2008 | Miyashita | 455/411 |
| 2002/0087894 | A1 | * | 7/2002 | Foley et al. | 713/202 |
| 2002/0095389 | A1 | * | 7/2002 | Gaines | 705/67 |

FOREIGN PATENT DOCUMENTS

EP 782296 A2 * 7/1997
EP 1176489 A2 * 1/2002

* cited by examiner

*Primary Examiner*—Emmanuel L Moise
*Assistant Examiner*—Zachary A Davis
(74) *Attorney, Agent, or Firm*—Fitzpatrick, Cella, Harper & Scinto

(57) ABSTRACT

A method and apparatus for enabling a user to obtain verification and gain access to a network server accessible only after verification without the user having to be aware of the communications method and verification protocol involve an image forming apparatus selecting a verification protocol having the highest level of security from among a plurality of previously determined verification protocols. The process of selecting the verification protocol with the highest level of security is then repeated with the verification protocol having the next highest level of security from among the remaining verification protocols until a connection to the network server is successfully established.

6 Claims, 4 Drawing Sheets

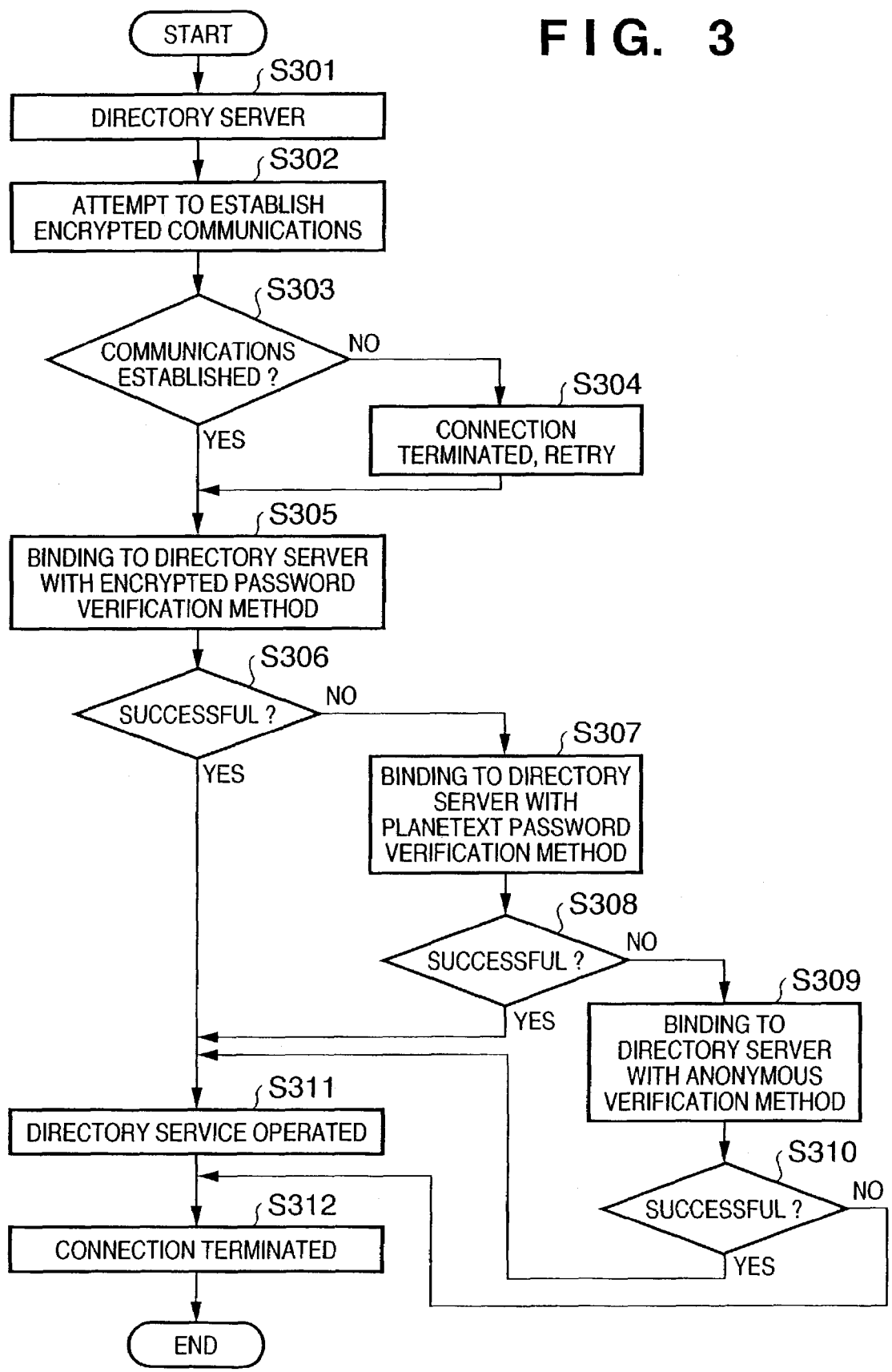

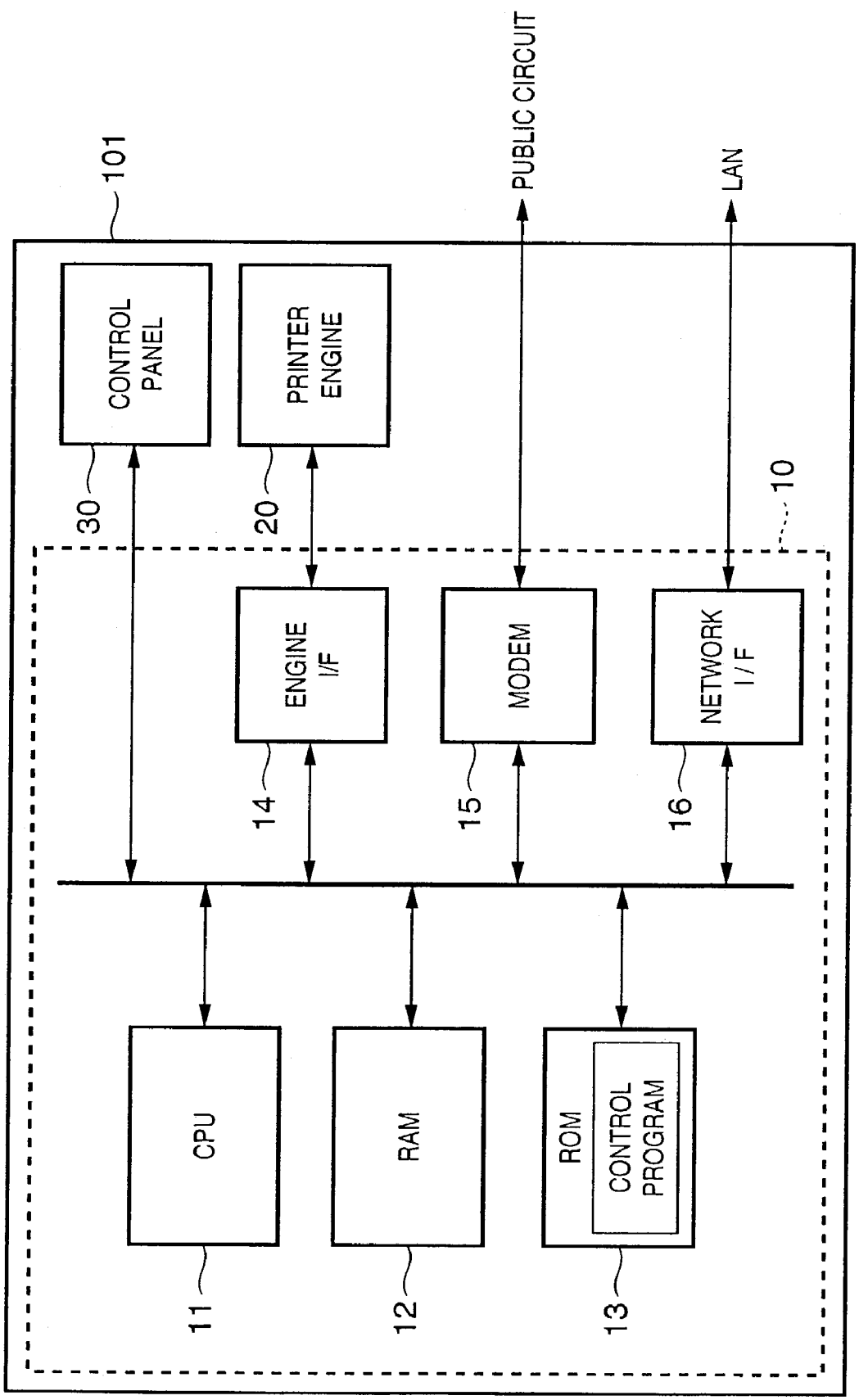

IMAGE FORMING APPARATUS AND CONTROL METHOD FOR SAME

FIELD OF THE INVENTION

The present invention relates to image forming apparatus and a control method for same, and more particularly, to a control method involving an image forming apparatus verification trial technique for a server device having an access control device.

BACKGROUND OF THE INVENTION

Conventionally, in a network, a directory server or a database server for storing data typically is configured so as to verify the identity of a client device before allowing access from that client device. Similarly, as verification methods there is the encrypted password type of verification protocol (e.g., Kerberos), the plain text type of verification protocol (e.g., Planetext) and the anonymous type of verification protocols, as well as encrypted communications carried out alongside such verification.

With the conventional image forming apparatuses connected to such types of networks, before communicating with the directory server or database server, the user designates a communications method, verification method and any information needed for verification (such as username and password).

However, with the conventional art as described above, it is necessary to know in advance, that is, before connecting to the directory service, the communications method and verification method provided by the directory server. If the user does not know the communications method and verification method provided by the directory server, the user will be denied access to the directory server, or limiting what can be done with data on the directory server. Therefore the user must remember the communications method and verification method, which can be a major burden.

SUMMARY OF THE INVENTION

The present invention has been conceived in light of the foregoing considerations.

According to two aspect of the present invention, preferably, a method and apparatus for enabling a user to obtain verification and gain access to a network server accessible only after verification without the user having to be aware of the communications method and verification protocol involve an image forming apparatus selecting a verification protocol having the highest level of security from among a plurality of previously determined verification protocols. The process of selecting the verification protocol with the highest level of security is then repeated with the verification protocol having the next highest level of security from among the remaining verification protocols until a connection to the network server is successfully established.

According to another aspect of the present invention, preferably, the type of operations that can be performed on the data in the server varies according to the verification protocol used when verification is successful.

According to another and further aspect of the present invention, preferably, the control method has a further step of establishing encrypted communications with the server before attempting verification.

Other features, effects and advantages of the present invention will be apparent from the following description, taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention, in which:

FIG. 3 is a flowchart showing the process of accessing a directory server of an image forming apparatus according to one embodiment of the present invention; and FIG. 4 is a schematic diagram of the hardware configuration of an image forming apparatus according to one embodiment of the present invention.

DETAILED DESCRIPTION OF THE PREFERRED EMBODIMENTS

Preferred embodiments of the present invention are described in detail in accordance with the accompanying drawings.

Figure 1:
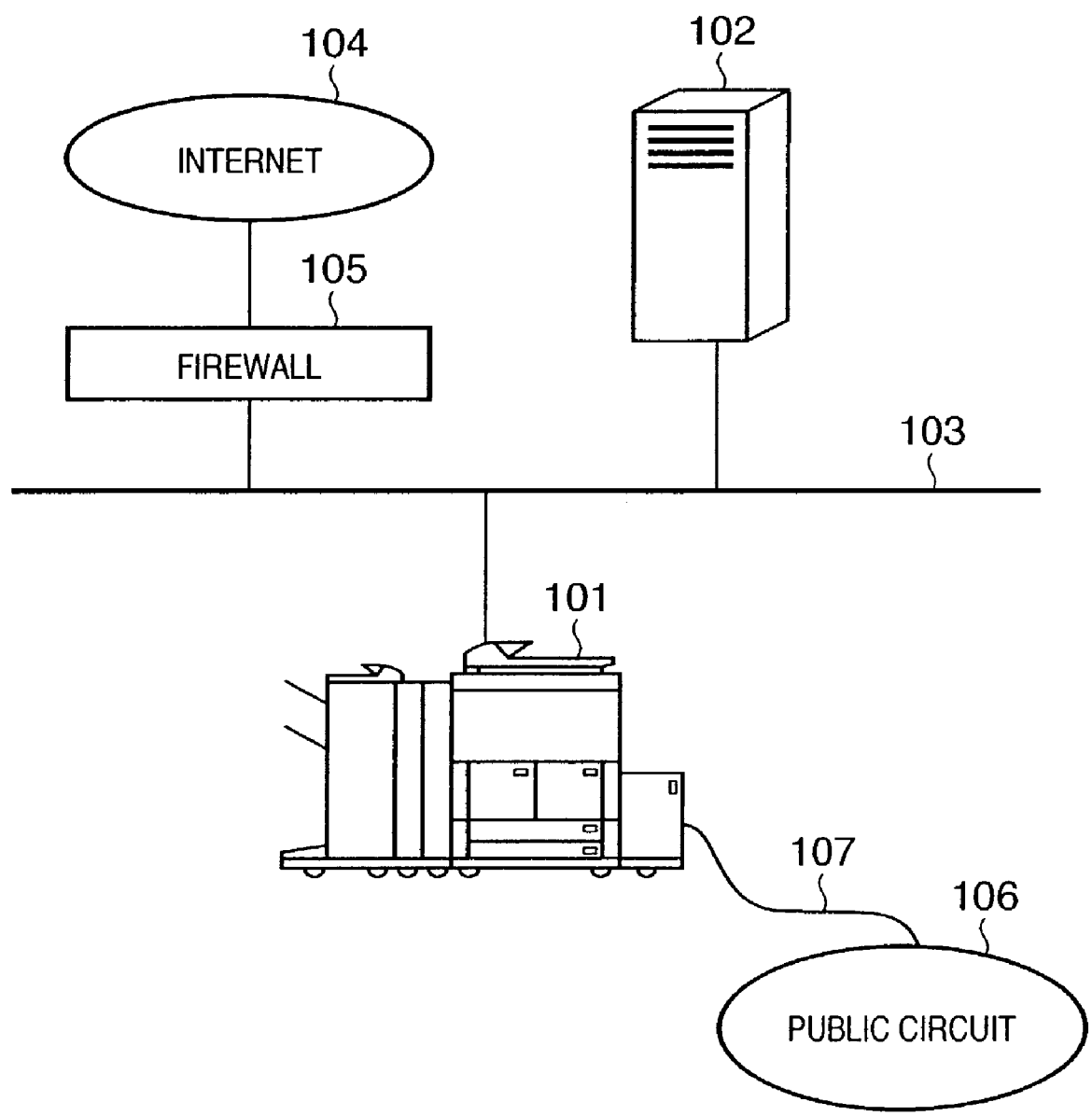
FIG. 1 shows an example of a network to which an image forming apparatus according to one embodiment of the present invention is connected.

FIG. 1 shows an example of a network to which an image forming apparatus according to one embodiment of the present invention is connected.

As shown in FIG. 1, an image forming apparatus 101 is connected to a Local Area Network (LAN) 103, and is further connected, via a firewall 105, to the internet 104. The image forming apparatus 101 is equipped to send and receive e-mail and internet faxes, and can send and receive image data to and from another communications party through the internet 104. Moreover, the image forming apparatus 101 is connected to a public network 106 via a telephone line 107, and so can also send and receive image data by facsimile.

Reference numeral 102 denotes a server device connected to a LAN 103 as an external device that, for example, manages personal e-mail addresses and facsimile numbers and provides a communications service such as a directory service. hereinafter, this server device is referred to as a directory server. The image forming apparatus 101 can access the directory server 102, obtain information such as an e-mail address or facsimile number through the directory service, and, using the information so obtained, send an e-mail or a facsimile. In order to prevent unauthorized access from the outside, the directory server 102 controls access by verification of the network device seeking access.

FIG. 4 is a schematic diagram of the hardware configuration of an image forming apparatus according to one embodiment of the present invention.

The controller 10 is equipped with a CPU 11 that controls the overall operation of the image forming apparatus 101 and a RAM 12 that functions as the main memory for the CPU 11. In addition, the controller 10 is equipped with a ROM 13 for storing a control program (to be described in detail later) for accessing the font and other types of data as well as the directory server 102. The controller is also equipped with an engine interface (I/F) 14 for communicating with a printer engine 20, a modem 15 for connecting to the public network 106 and a network interface (I/F) 16 for connecting to the LAN 103. Image forming apparatus 101 also includes a control panel 30 in communication with CPU 11, RAM 12, ROM 13, engine interface (I/F) 14, modem 15 and network interface (I/F) 16.

Figure 2:
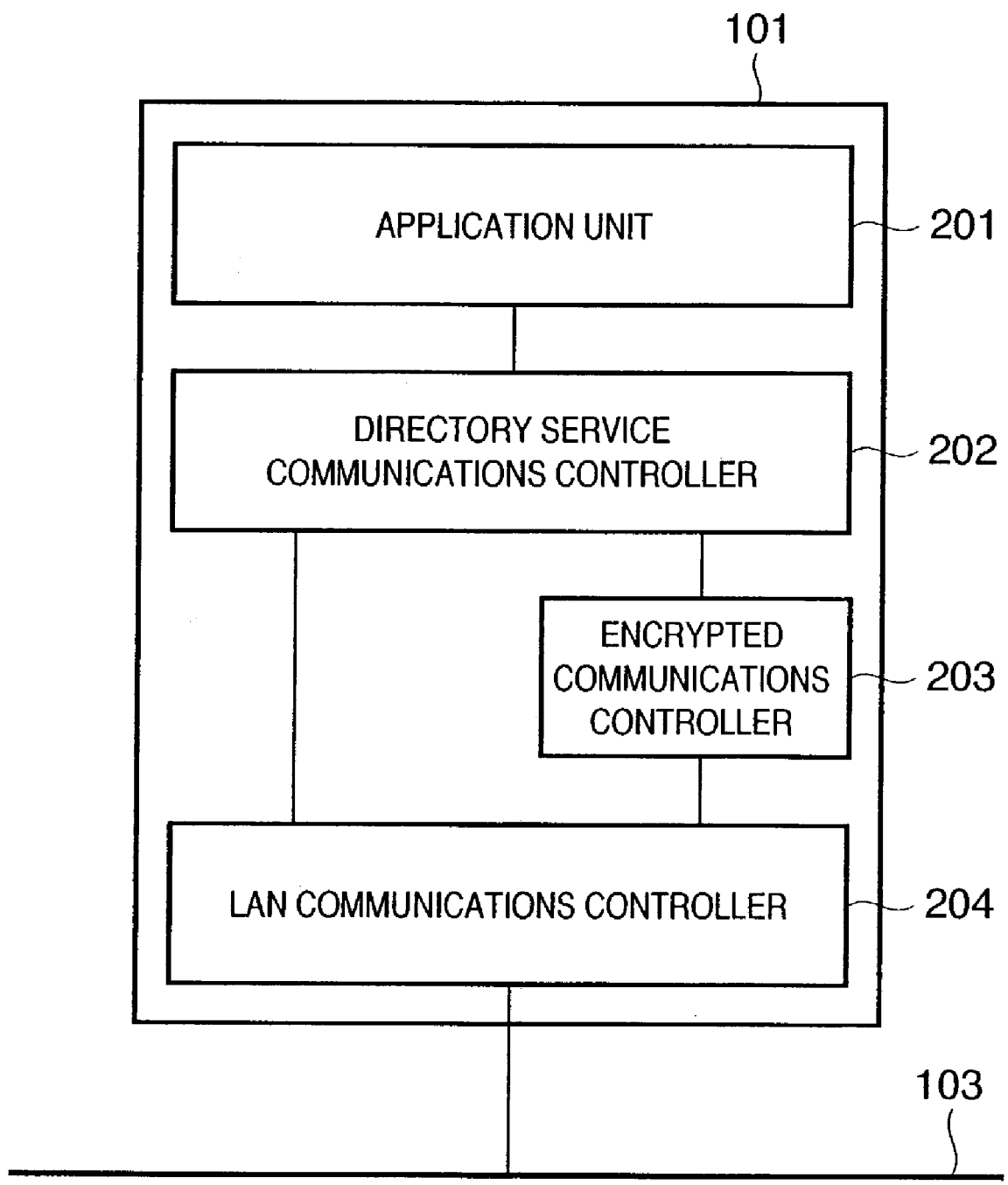
FIG. 2 is a block diagram of the functional configuration of a control program according to one embodiment of the present invention.

FIG. 2 is a block diagram of the functional configuration of the control program stored in the ROM 13 described above, according to one embodiment of the present invention. As shown in the diagram, an application unit 201 controls connection to the directory server 102, designation of the communications method, verification requests to the directory server 102 and data manipulation. According to instructions from the application unit 201, a directory service communications controller 202 controls the directory service protocol and controls communications with the directory server 102, using an encrypted communications controller 203 and a LAN communications controller 204. The encrypted communications controller 203 establishes encrypted communications with the directory server 102 and provides high security level encrypted communications. The LAN communications controller 204 controls communications protocol within the Local Area Network.

FIG. 3 is a flow chart showing the process of accessing the directory server 102 from the image forming apparatus 101, according to one embodiment of the present invention. The process described in this flow chart is implemented by the control program having the structure described above. It should be noted that the control program is stored in the ROM 13 as described above, is loaded into the RAM 12 and executed by the CPU 11.

Based on input from a control panel 30, the application unit 201 instructs the directory service communications controller 202 to connect to the directory server 102 and the process then proceeds to a step S301, where the LAN communications controller 204 establishes a connection with the directory server 102.

Next, in a step S302, using the encrypted communications controller 203, an attempt is made to establish encrypted communications. In a succeeding step S303, a determination is made as to whether or not communication between the directory server 102 and the image forming apparatus 101 have been established. If so, then the process proceeds to a step S305, and if not, then the process proceeds to a step S304. In a step S304, a retry is attempted after the connection is terminated, and thereafter the process proceeds to step S305.

In the present embodiment, a plurality of verification protocols (in this case three) of varying levels of security are provided, so verification can be attempted using any of these varying verification protocols. For example, a first verification protocol may be an encrypted password type (e.g., Kerberos), a second verification protocol may be a plain text type (e.g., Planetext) and a third verification protocol may be an anonymous type. These first, second and third verification protocols are listed in order of descending security level.

As described below, the control program selects the verification protocol with the highest level of security and attempts verification to the directory server 102.

In step S305, first, the encrypted password type of first verification protocol is used to attempt verification to the directory server 102. In the case of an encrypted password verification protocol, for example, if the user name is "maki" and the password is "pass" and these are used for verification, the password "pass" is encrypted and sent to the directory server 102. Then, in a step S306, the image forming apparatus 101 determines whether or not the transmission has been accepted by the directory server 102.

If the directory server 102 indicates acceptance, then the process proceeds to a step S311, providing communications services. For example, it is now possible to access the data on the directory server 102 and search it, add to it, change it, and so forth. The type of operations authorized to be performed on the data is set at the directory server 102 side, so that authorized operations depend on these settings. For example, if the operations of searching, adding and changing have been authorized for the user name "maki", then a user using the "maki" user name can perform these operations. When these operations are finished then the process proceeds to a step S312 and the connection is terminated.

However, if in step S306 the directory server 102 indicates that it does not accept the input user name and/or password, then the process proceeds to a step S307 and the image forming apparatus 101 attempts verification to the directory server 102 using the plain text password of the second type of verification protocol. The process then proceeds to a step S308. In the case of a plain text password verification protocol, the password "pass" is not encrypted but is sent as is to the directory server 102, in the order written. In step S308, if the directory server 102 indicates acceptance of the transmitted user name and password, the process proceeds to step S311. As described above, in step S311, various operations can be executed in accordance with the authorization given to verified users. On the other hand, if in step S308 the directory server 102 does not accept the input user name and/or password, the process then proceeds to a step S309 and the image forming apparatus 101 attempts verification to the directory server 102 using the anonymous verification method of the third type of verification protocol. The process then proceeds to a step S310. In the anonymous type of verification protocol, "anonymous" is the user name and "anonymous" is the password.

In step S310, if the directory server 102 accepts the transmission, the process then proceeds to step S311. As with the setups described above, the authorization to perform a particular operation on or to the directory service while verified in an anonymous verification system likewise depends on the settings on the directory server 102 side. For example, if the directory server 102 is set up so that a user whose identity is verified using the anonymous verification protocol is authorized only to search the directory database, then of course such a user is unable to perform any other operation besides searching. In other words, the range of operations that can be performed with the directory service in step S311 is limited via steps S309 and S310. If, on the other hand, in step S310 the directory server 102 indicates that the input username and/or password are not accepted, the process then proceeds to a step S312. Since access to the directory service is now denied no matter which verification protocol is used, the image forming apparatus 101 terminates the connection and the process ends because it is now clear that the directory server 102 does not permit even anonymous verification.

Thus, according to the present embodiment, when the image forming apparatus 101 accesses the directory server 102, the communications method is automatically determined and successive attempts at verification using verification protocols of descending levels of security are made until a connection is successfully established. The advantage of the present embodiment is that it allows the user to use the directory service without having to be aware of the communications method and verification protocol, thus reducing the burden on the user.

In addition, although the above-described embodiment is described in terms of a system composed of a single device (e.g., a host computer, interface device, reader, printer, etc.) the present invention may also be implemented by a system comprising a plurality of devices (e.g., a copier, facsimile machine, etc.).

It should be noted that a software program for implementing the capabilities of the above-described embodiments (that is, a program corresponding to the process shown in the flow chart shown in FIG. 3), supplied either directly from a recording medium or by using wire or wireless communications, to a system or apparatus having a computer capable of executing such program, the execution of such program by the computer of the system or apparatus achieving equivalent capabilities of the above-described embodiments, is included in the present invention.

Accordingly, a program supplied to and installed in such a computer for the purpose of implementing the functional processes of the present invention itself achieves the present invention. That is, a computer program for implementing the processes performed by the present invention is itself included within the present invention.

In such a case, provided the program capabilities are present, the format of the program, whether executed by object code or by an interpreter, for example, does not matter.

The recording media for supplying the program include, but are not limited to, magnetic recording media such as a floppy disk, a hard disk or magnetic tape, optical or magneto-optical recording media such as MO, CD-ROM, CD-R, CD-RW, DVD-ROM, DVD-R or DVD-RW, or a non-volatile semiconductor memory.

Wire and wireless methods of supplying the program to the system or apparatus described above include, but are not limited to, a computer program that forms the present invention on a server on the computer network, or storing a data file (that is, a program data file) that can become a computer program that forms the present invention on a client computer, such as a compressed file with a self-installing capability, and downloading the program data file to a connected client computer. In this case, the program data file can be divided into a plurality of segment files and the segment files disposed at different servers.

In other words, a server device that downloads to a plurality of users a program data file for implementing the function processes of the present invention by computer is also included within the present invention.

As can be appreciated by those of ordinary skill in the art, the program of the present invention may be encrypted and stored on a recording medium such as a CD-ROM and distributed to users, with decryption data for decrypting the encryption being made available to users who fulfill certain conditions for example by downloading from a home page via the Internet, the users then using the decryption data to execute the encrypted program for installation on a computer.

In addition, as can be appreciated by those of ordinary skill in the art, in addition to implementing the capabilities of the above-described embodiments by reading out and executing the above-described program by computer, the above-described capabilities of the embodiments described above can also be implemented by Operating System (OS) software running on a computer and performing some or all of the actual processes described heretofore based on the program instructions.

Moreover, the present invention also includes an instance in which the above-described capabilities of the embodiments described above are achieved by processes executed in whole or in part by a CPU or the like provided in a function expansion card or a function expansion unit based on program code instructions, after the program code read from the recording medium is written to a memory provided in such a function expansion card inserted into the computer or such a function expansion unit connected to the computer.

As many apparently widely different embodiments of the present invention can be made without departing from the spirit and scope thereof, it is to be understood that the invention is not limited to the specific preferred embodiments described above thereof except as defined in the claims.

What is claimed is:

1. An image processing apparatus capable of communicating with a server which provides a directory service via a network, the apparatus comprising:

establishing means for establishing a connection to the server using encrypted communication;

first verification means for automatically selecting a first verification protocol out of a plurality of verification protocols having different security levels from each other upon establishing the connection, and attempting verification to the server using the first verification protocol;

second verification means for automatically selecting a second verification protocol out of the plurality of verification protocols upon receiving a negative acknowledgment from the server when said first verification means attempt verification to the server using the first verification protocol, and retrying verification to the server using the second verification protocol;

third verification means for automatically selecting a third verification protocol out of the plurality of verification protocols upon receiving a negative acknowledgment from the server when said second verification means attempt verification to the server using the second verification protocol, and retrying verification to the server using the third verification protocol; and operation means for, in a case in which a positive acknowledgment is received from the server when the verification is attempted to the server by said first, second, or third verification means, performing operations for the directory service under an access authority corresponding to the selected verification protocol, wherein the first verification protocol has the highest security level in the plurality of verification protocols, the second verification protocol has the second-highest security level in the plurality of verification protocols, and the third verification protocol has a security level lower than the first and second verification protocols, and wherein the first verification protocol is an encrypted password protocol, the second verification protocol is a plain text password protocol, and the third verification protocol is an anonymous authentication protocol, and wherein, in a case in which a positive acknowledgment is not received from the server when the verification attempted to the server by said first, second, and third verification means, the connection established by said establishing means is disconnected.

2. The apparatus according to claim 1, wherein, upon receiving a positive acknowledgment from the server when the verification is attempted to the server by said first or second verification means, acceptable operations by said operation means include a search, addition and change of a file in the server, and wherein, upon receiving the positive acknowledgment from the server when the verification is attempted to the server by said third verification means, acceptable operation by said operation means only includes a search for a file from the server, and wherein the connection established by said establishing means is disconnected after the completion of the operation.

3. A method of communicating with a server which provides a directory service via a network, the method comprising:
   establishing a connection to the server using encrypted communication;
   automatically selecting a first verification protocol out of a plurality of verification protocols having different security levels from each other upon establishing the connection, and attempting verification to the server using the first verification protocol;
   automatically selecting a second verification protocol out of the plurality of verification protocols upon receiving a negative acknowledgement from the server when attempting verification to the server using the first verification protocol, and retrying verification to the server using the second verification protocol;
   automatically selecting a third verification protocol out of the plurality of verification protocols upon receiving a negative acknowledgement from the server when attempting verification to the server using the second verification protocol, and retrying verification to the server using the third verification protocol;
   performing operations for, in a case in which a positive acknowledgement is received from the server when attempting the verification to the server using the first, second, or third verification protocol, the directory service under an access authority corresponding to the verification protocol being used,
   wherein the first verification protocol has the highest security level in the plurality of verification protocols, the second verification protocol has the second-highest security level in the plurality of verification protocols, and the third verification protocol has a security level lower than the first and second verification protocols,
   and wherein the first verification protocol is an encrypted password protocol, the second verification protocol is a plain text password protocol, and the third verification protocol is an anonymous authentication protocol,
   and wherein, in a case in which a positive acknowledgement is not received from the server when the verification attempted to the server by said first, second, and third verification protocols, the established connection is disconnected.

4. The method according to claim 3, wherein, upon receiving a positive acknowledgement from the server when attempting verification to the server using the first or second verification protocol, acceptable operations in the performing-operations step include searching, adding and changing of a file in the server,
   and wherein, upon receiving the positive acknowledgement from the server when attempting verification to the server using said third verification protocol, acceptable operations in the performing operations step only include searching for a file from the server,
   and wherein the connection established is disconnected after the completion of the operation.

5. A computer-readable medium having control logic stored therein for a computer program that causes a computer to communicate with a server which provides a directory service via a network, the control logic comprising:
   first computer-readable program code for causing the computer to establish a connection to the server using encrypted communication;
   second computer-readable program code for causing the computer to automatically select a first verification protocol out of a plurality of verification protocols having different security levels from each other upon establishing the connection, and attempting verification to the server using the first verification protocol;
   third computer-readable program code for causing the computer to automatically select a second verification protocol out of the plurality of verification protocols upon receiving a negative acknowledgement from the server when attempting verification to the server using the first verification protocol, and retrying verification to the server using the second verification protocol;
   fourth computer-readable program code for causing the computer to automatically select a third verification protocol out of the plurality of verification protocols upon receiving a negative acknowledgement from the server when attempting verification to the server using the second verification protocol, and retrying verification to the server using the third verification protocol;
   fifth computer-readable program code for, in a case in which a positive acknowledgement is received from the server when the verification is attempted to the server by said first, second, or third verification protocols, causing the computer to perform operations for the directory service under an access authority corresponding to the verification protocol being used,
   wherein the first verification protocol has the highest security level in the plurality of verification protocols, and the second verification protocol has the second-highest security level in the plurality of verification protocols, and the third verification protocol has a security level lower than the first and second verification protocols,
   and wherein the first verification protocol is an encrypted password protocol, the second verification protocol is a plain text password protocol, and the third verification protocol is an anonymous authentication protocol,
   and wherein, in a case in which a positive acknowledgement is not received from the server when the verification attempted to the server by said first, second, and third verification protocols, the established connection is disconnected.

6. The computer-readable medium according to claim 5, wherein, upon receiving a positive acknowledgement from the server when attempting verification to the server using the first or second verification protocol, the fifth computer-readable program code causes the computer to perform an operation including searching, adding and changing of a file in the server,
   and wherein, upon receiving the positive acknowledgement from the server when attempting verification to the server using said third verification protocol, the fifth computer-readable program code causes the computer to perform an operation only including searching for a file from the server,
   and wherein the connection established is disconnected after the completion of the operation.

* * * * *